United States Patent
Böge et al.

(10) Patent No.: US 6,442,861 B1
(45) Date of Patent: *Sep. 3, 2002

(54) POSITION MEASURING DEVICE

(75) Inventors: Ludwig Böge, Jenapriessnitz; Hans-Joachim Freitag, Jena, both of (DE)

(73) Assignee: Dr. Johannes Heindenhain GmbH, Traunreut (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/527,423

(22) Filed: Mar. 17, 2000

(30) Foreign Application Priority Data

Mar. 19, 1999 (DE) .......................... 199 12 310

(51) Int. Cl.[7] .............................. G01B 21/16
(52) U.S. Cl. .......................... 33/706; 33/703
(58) Field of Search .................. 33/702, 703, 704, 33/705, 706, 707

(56) References Cited

U.S. PATENT DOCUMENTS

| | | | | |
|---|---|---|---|---|
| 4,444,504 A | * | 4/1984 | Takizawa | 33/706 |
| 4,600,203 A | * | 7/1986 | Miller et al. | 33/706 |
| 5,065,525 A | * | 11/1991 | Szenger | 33/704 |
| 5,095,637 A | * | 3/1992 | Kraus | 33/702 |
| 5,157,846 A | * | 10/1992 | Fromme | 33/704 |
| 5,182,867 A | * | 2/1993 | Nelle | 33/705 |
| 5,551,163 A | * | 9/1996 | Affa | 33/706 |
| 5,611,148 A | * | 3/1997 | Affa | 33/702 |
| 5,630,283 A | * | 5/1997 | Nelle | 33/702 |
| 5,655,311 A | * | 8/1997 | Affa | 33/706 |
| 5,832,616 A | * | 11/1998 | Fiedler | 33/706 |
| 5,979,238 A | | 11/1999 | Boege et al. | 33/755 |
| 6,154,974 A | * | 12/2000 | Nakajima et al. | 33/707 |

FOREIGN PATENT DOCUMENTS

| | | |
|---|---|---|
| DE | 196 11 983 | 7/1997 |
| EP | 0 416 391 | 3/1991 |

OTHER PUBLICATIONS

M. Von Johannes et al., "Meβsysteme für die Automatisierungstechnik", AMB, Stuttgart, Dima Sep. 1998, Halle 11, No. 9, pp. 48–52.

* cited by examiner

Primary Examiner—G. Bradley Bennett
(74) Attorney, Agent, or Firm—Kenyon & Kenyon

(57) ABSTRACT

A position measuring device having a graduated scale carrier member which is secured to a holder is described. The graduated scale carrier member is secured to the bottom side of the holder, so as to float over a viscous liquid film. The holder, in turn, is elastically supported on a mount. The measuring graduation marking is scanned through the holder, which is preferably made of transparent glass.

21 Claims, 5 Drawing Sheets

POSITION MEASURING DEVICE

The present invention relates to a position measuring device having a graduated scale carrier member which is secured to a holder.

DESCRIPTION OF RELATED ART

Position measuring devices of this kind are used, in particular, on machine tools for measuring the relative position of a tool with respect to a workpiece. The graduated scale carrier member is either directly adhesively mounted on an object, such as a machine part to be measured, or is secured to this object by way of a holder, for example one that at the same time constitutes a housing. It has become apparent that the measuring accuracy of a position measuring device is substantially dependent upon the mounting attachment of the graduated scale carrier member to the object to be measured.

To optimize this attachment, in accordance with German Patent 196 11 983 C1, a viscous liquid film is used between the graduated scale carrier member and the holder. The capillary action of the viscous intermediate layer provides for the coupling between the graduated scale carrier member and the holder, and it substantially uncouples the graduated scale carrier member from the holder with respect to occurring mechanical strains.

The disadvantage of this arrangement is that the scale graduation marking of the graduated scale carrier member lies completely exposed.

To solve this problem, the European Patent 0 416 391 B1describes a position measuring device, whose graduated scale carrier member is made of glass, and which is secured to the holder by its side bearing on the scale graduation marking by way of a viscous liquid film. The scale graduation marking is scanned through the transparent glass carrier.

In this arrangement, the scale graduation marking is accommodated in a manner in which it is very well protected from environmental influences. The drawback of the system, however, is that the graduated scale carrier member itself is exposed to all environmental influences. Because of the relatively large distance of the scale graduation marking from the neutral fiber of the graduated scale carrier member, the graduation-marking bearing surface is considerably expanded or compressed under the influence of external mechanical forces causing an uneven supporting base. The resulting scale error is relatively significant.

SUMMARY OF THE INVENTION

The present invention is a position measuring device, whose graduated scale carrier member is substantially uncoupled from its holder with respect to mechanical strains, and is also protected in a simple manner from external mechanical influences.

In one embodiment, the invention is a position measuring device comprising a graduated scale carrier member, a measuring graduation marking disposed on the graduated scale carrier member, a holder having a first surface facing the measuring graduation marking, the holder being adhesively secured to the graduated scale carrier member by an elastic intermediate film, and a scanning unit for scanning the measuring graduation marking to produce positionally dependent signals, the scanning unit being disposed adjacent a second surface of the holder, opposite the first surface. The measuring graduation marking is disposed opposite to the scanning unit, and is scannable by the scanning unit through the holder.

The present invention provides the benefit that, using simple means, the scale graduation marking is effectively protected from impurities and from external mechanical influences, so that this position measuring device can be used for performing highly precise measurements.

Other advantages, which are derived from advantageous embodiments of the present invention, are delineated in the following description.

BRIEF DESCRIPTION OF THE DRAWINGS

Exemplary embodiments of the present invention are described with reference to the drawings. In the drawings.

DETAILED DESCRIPTION OF THE EMBODIMENTS OF THE INVENTION

Figure 1:
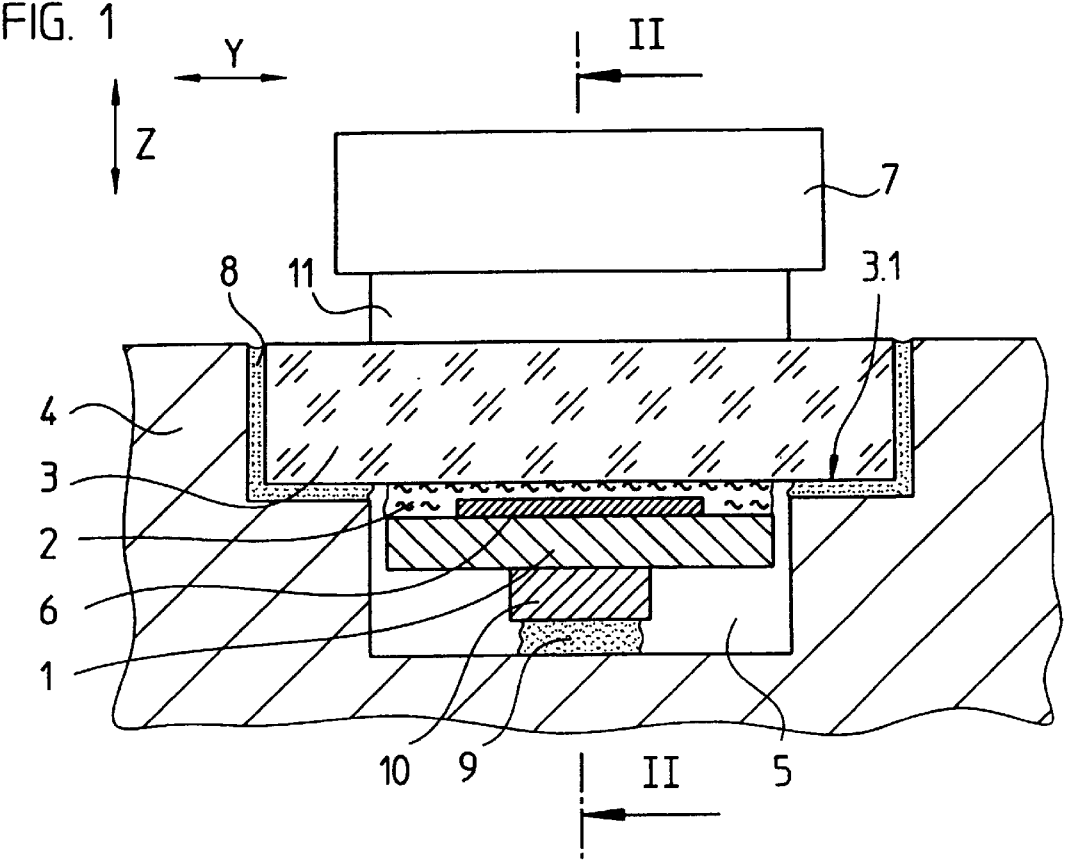
FIG. 1 shows a cross-section I—I of a first linear measuring device.
Figure 2:
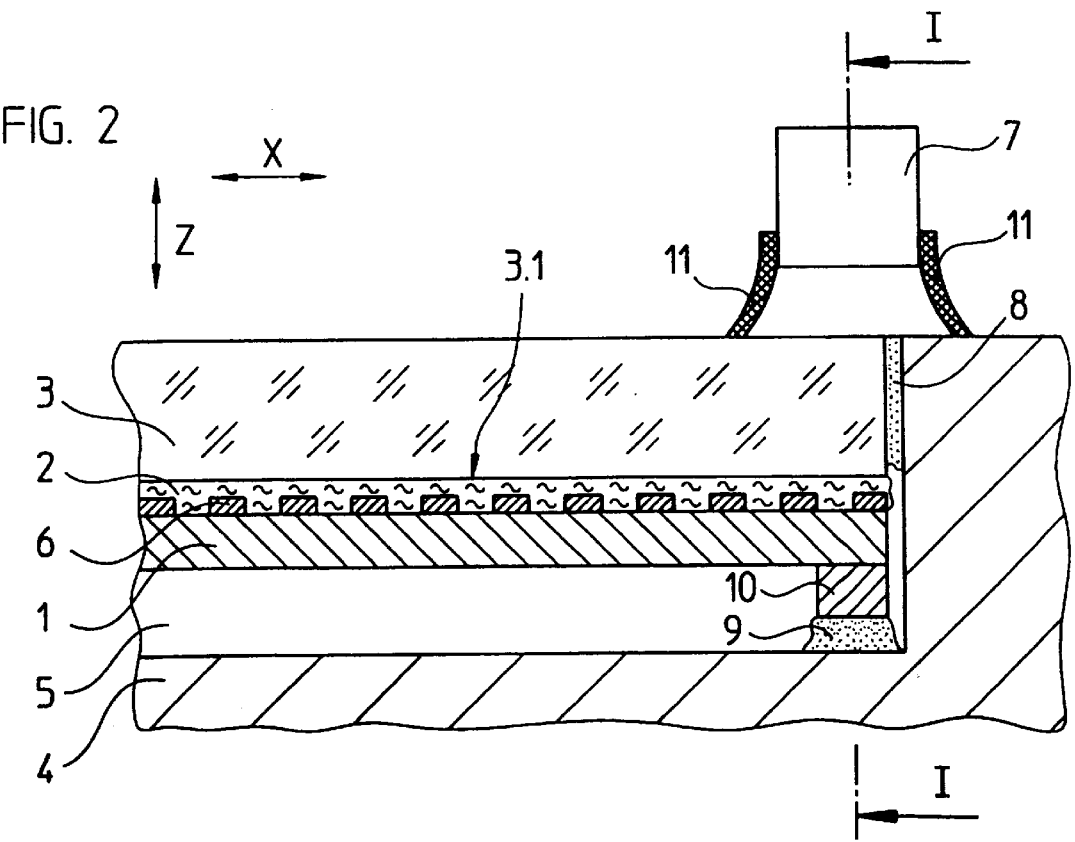
FIG. 2 shows a longitudinal cross-section II—II of the linear measuring device in accordance with FIG. 1.

FIGS. 1 and 2 illustrate a first exemplary embodiment of the present invention. This position measuring device, in the form of a linear measuring device to measure length, is made of a graduated scale carrier member 1 which adheres by adhesive forces via a viscous liquid film 2 to a holder 3. Holder 3, in turn, is secured to a mount 4. To accommodate graduated scale carrier member 1 in a protective manner, a groove 5 is introduced in mount 4. This groove 5 is hermetically covered by holder 3.

Graduated scale carrier member 1 can be a thin, flexible strip for example about 0.2 mm thick and 8 mm wide, made of a polished, commercial high-grade steel band. Applied to surface 3.1 of graduated scale carrier member 1, diametrically opposing holder 3, is a reflecting measuring graduation marking 6 in the form of an incremental scale graduation marking and/or an absolute coding. This measuring graduation marking 6 is scanned photoelectrically, in a generally known way, through transparent holder 3, by a scanning unit 7. Thus, in response to a relative movement with respect to measuring graduation marking 6 in measuring direction X, scanning unit 7 supplies positionally dependent electrical scanning signals.

The viscous liquid film 2 can be preferably a transparent silicone oil having a kinematic viscosity of about 10,000 $mm^2/s$. Scale graduation carrier member 1 is held adhesively to bottom side 3.1 of holder 3 solely by the viscosity of liquid film 2. Liquid film 2 ensures that scale graduation carrier member 1 is secured in a manner that is uncoupled from strain. Film 2 permits a free linear deformation of graduated scale carrier member 1 relative to holder 3 in response to temperature changes, without unacceptable strains such as compression and expansion occurring in graduated scale carrier member 1. This means there are no unwanted strains being transferred to the holder by graduated scale carrier member 1 in an unacceptable manner. This linear deformation causes a partial displacement of graduated scale carrier member 1 in relation to holder 3 in measuring direction X, with only a small amount of static friction occurring.

Due to the small thickness of graduated scale carrier member 1, bending strain influences are likewise negligibly small. Between graduated scale carrier member 1 and bottom side 3.1 of holder 3, liquid film 2 is introduced over the entire surface as a thin intermediate layer that runs homogeneously in measuring direction X. The viscosity of liquid film 2 induces the thin and flexible graduated scale carrier member 1, which has a low specific weight, to cling closely to bottom side 3.1 of holder 3, by the adhesive forces. This surface 3.1 is used as a reference surface to determine how straight and even is graduated scale carrier member 1.

Essentially, graduated scale carrier member 1 floats on holder 3, without lifting off from it. The advantage of using glass as a material for holder 3 is that it is available inexpensively in long lengths, and has a high surface quality and evenness. Advantageously, the dimensions and material for holder 3 can be selected to provide a high intrinsic stability and, thus, constant evenness and straightness along measuring graduation marking X. Capillary action prevents liquid 2 from flowing out of the gap, and draws graduated scale carrier member 1 toward bottom side 3.1.

Holder 3 can be preferably attached to mount 4 in a manner that is a function of the thermal coefficients of expansion of holder 3 and mount 4. Given the same coefficients of expansion, holder 3 could, for example, be rigidly secured over its entire length to mount 4. In practical use, however, even given the same coefficients of expansion, different expansions occur because of temperature gradients. Therefore, it is advantageous to design the attachment in such a way that holder 3 is also uncoupled from mount 4, viewed in measuring direction X. This can be achieved by securing holder 3 by a permanent-elastic adhesive 8, which in particular can be a silicon rubber adhesive layer, to mount 4. Adhesive 8 between mount 4 and holder 3 ensures a free linear expansion of mount 4, as well as of holder 3, without unacceptable strains occurring or being transferred to holder 3.

To define a fixed reference point 9 of the measuring system, graduated scale carrier member 1 is rigidly coupled directly to mount 4 at one place, for example at one single location along graduated scale carrier member 1. This coupling is shown schematically in the drawings, as a locally rigid adhesive connection 9, however, the coupling can also be implemented as a welded or screw-type connection. In the depicted example, groove 5 is so deep that an adhesive connection 9 between graduated scale carrier member 1 and mount 4 would be relatively thick, and thus unstable. For this reason, a spacer plate 10 can be welded onto the bottom side of graduated scale carrier member 1 to provide leveling compensation, and the rigid adhesive connection 9 can be formed between spacer plate 10 and mount 4.

Instead of on the bottom side of graduated scale carrier member 1, rigid adhesive connection 9 can also be provided, for example, on one side edge, on the extremity, or on a front side of carrier member 1. Alternatively, fixed point 9 can also be defined by way of holder 3, where graduated scale carrier member 1 is rigidly fixed at one location (viewed in the X direction) to holder 3. In addition, in this design holder 3 can be rigidly fixed at this location to mount 4. Preferably, fixed point 9 can be defined at one end of graduated scale carrier member 1.

The described configuration provides for an arrangement in which graduated scale carrier member 1 is protected by holder 3. The exposed surface of holder 3 can be cleaned quite simply, by wiping it clean with a wiper 11 mounted on scanning unit 7. Any forces introduced by cleaning wiper 11 are not transferred to graduated scale carrier member 1 because of the uncoupled attachment.

Figure 8:
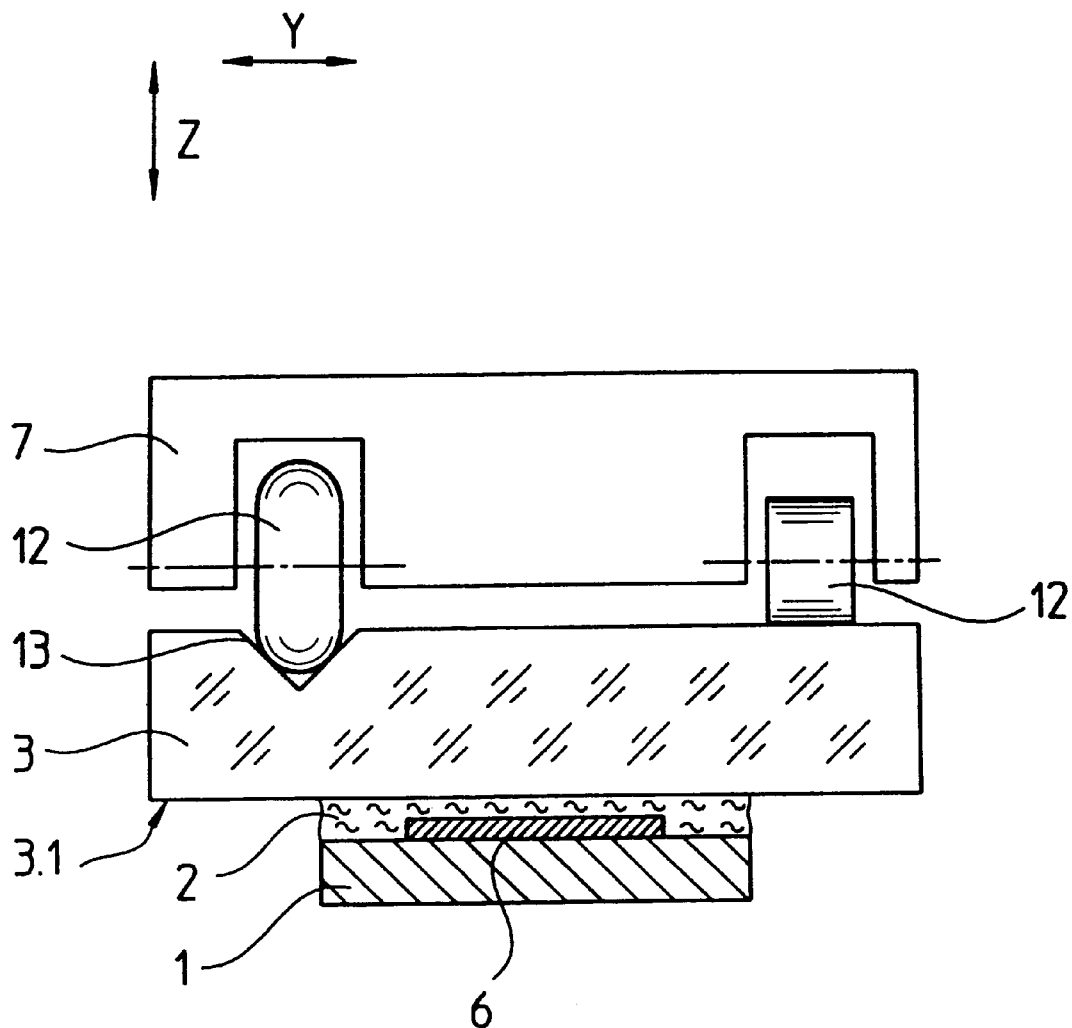
FIG. 8 shows a cross-section of a further embodiment of a linear measuring device, including a guideway for the scanning unit.

In one embodiment shown in FIG. 8, scanning unit 7 can be guided on mount 4. The guidance can also be carried out on holder 3, since scanning unit 7 is only supported on holder 3 by sliding or roller elements 12. In addition, at least a V-groove 13 running in measuring direction X is introduced in holder 3, ensuring a straight guidance of scanning unit 7 transversely to measuring direction X, thus in the Y direction.

Figure 3:
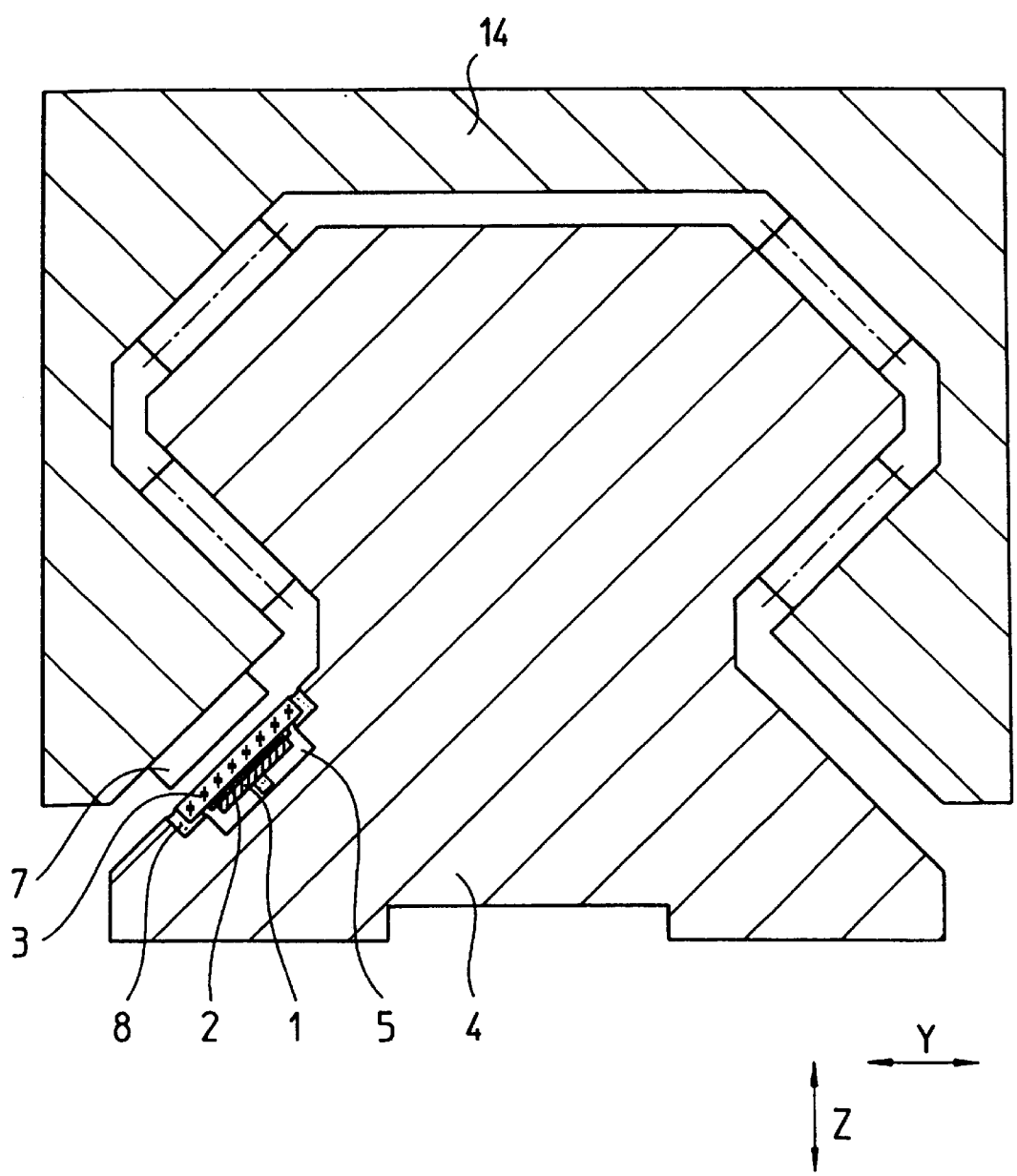
FIG. 3 shows a first embodiment of a linear measuring device, integrated in a guideway.

One especially advantageous application of the length measuring device shown in FIGS. 1 and 2 is the space-saving integration in guide units 4, 14, which can be attached as an independent assembly to the machine base of a machine tool. This integration is schematically shown in FIG. 3. Graduated scale carrier member 1 can be housed protectively in a groove 5 of guideway 4 forming the mount. Scanning unit 7 is secured to guide block 14. Guide unit 4, 14 can be a recirculating ball guideway, a recirculating roller guideway, or another commercial guide unit 4, 14.

Integration of the measuring device in a linear drive is also possible.

Figure 4:
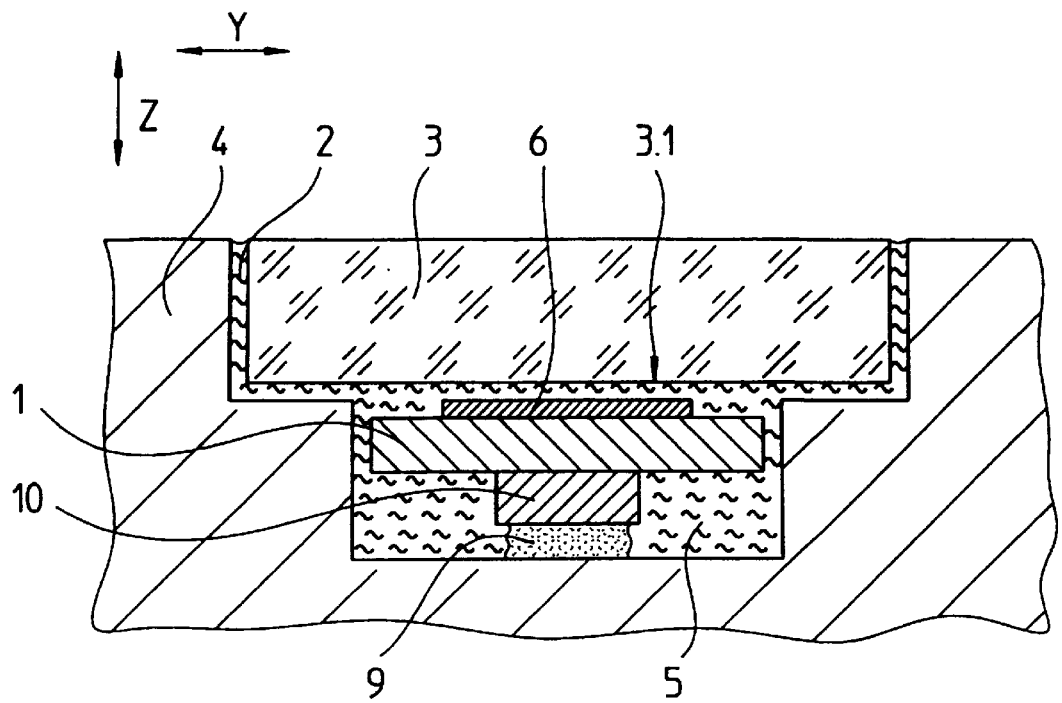
FIG. 4 shows a cross-section of a second embodiment of a linear measuring device.

The second exemplary embodiment illustrated in FIG. 4 differs from the first exemplary embodiment in that, instead of the permanent-elastic adhesive 8, a viscous liquid 2 is used to secure holder 3 to mount 4. For this, a thin gap filled with liquid 2 is provided between the surfaces of holder 3 and the surfaces of mount 4, so that the viscosity of liquid 2 elastically retains holder 3 on mount 4 in measuring direction X. In addition, the entire groove space 5 can be filled with liquid 2. However, the gap between the groove bottom and the bottom side of graduated scale carrier member 1 is substantially larger than the gap between graduated scale carrier member 1 and holder 3. Thus, the adhesive forces between graduated scale carrier member 1 and holder 3 should be substantially greater that the forces between graduated scale carrier member 1 and the groove bottom of mount 4.

In this design, groove space 5 can be used as a liquid repository 4 for forming a homogenous liquid layer 2 between graduated scale carrier member 1 and holder 3. The required liquid 2 is then drawn by the capillary effect into the gap. Liquid 2 also provides a sealing action between holder 3 and mount 4. A simple interchangeability of holder 3 with scale carrier member 1 is also possible in this refinement.

Figure 5:
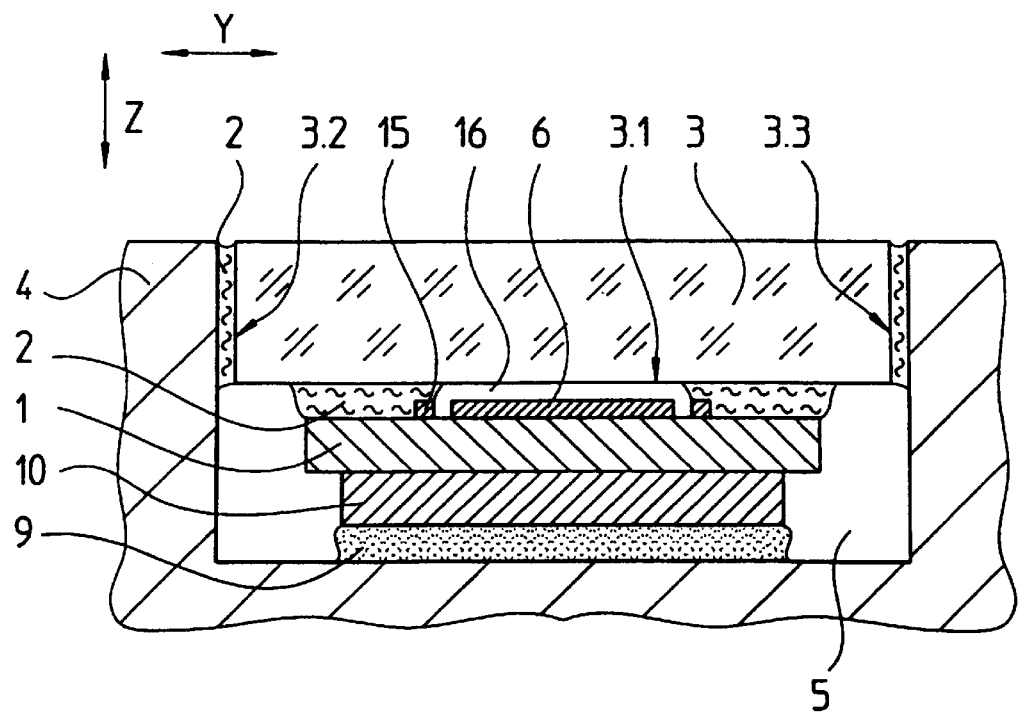
FIG. 5 shows a cross-section of a third embodiment of a linear measuring device.

In the third exemplary embodiment in accordance with FIG. 5, holder 3 can be secured to mount 4 exclusively by its longitudinal sides 3.2 and 3.3 running transversely to surface 3.1. Here, the advantage is that deformations of mount 4 in the Z direction are not directly transferred to holder 3. The evenness and straightness of the intrinsically stable holder 3 is decoupled from mount 4 by liquid film 2. In place of liquid film 2, a permanent-elastic adhesive can also be used between holder 3 and mount 4.

It is also shown in the exemplary embodiment of FIG. 5 that it is not necessary to provide liquid film 2 over the entire width of graduated scale carrier member 1, in the Y direction. Thus, when working with certain specific requirements, one can target specific areas, for example, of the scanning region of measuring graduation marking 6 to be kept free of liquid 2. In this case, flow-arrester edges 15 can be provided on graduated scale carrier member 1 and/or on holder 3 to prevent liquid 2 from flowing into space 16 that is to be kept free of liquid.

Figure 6:
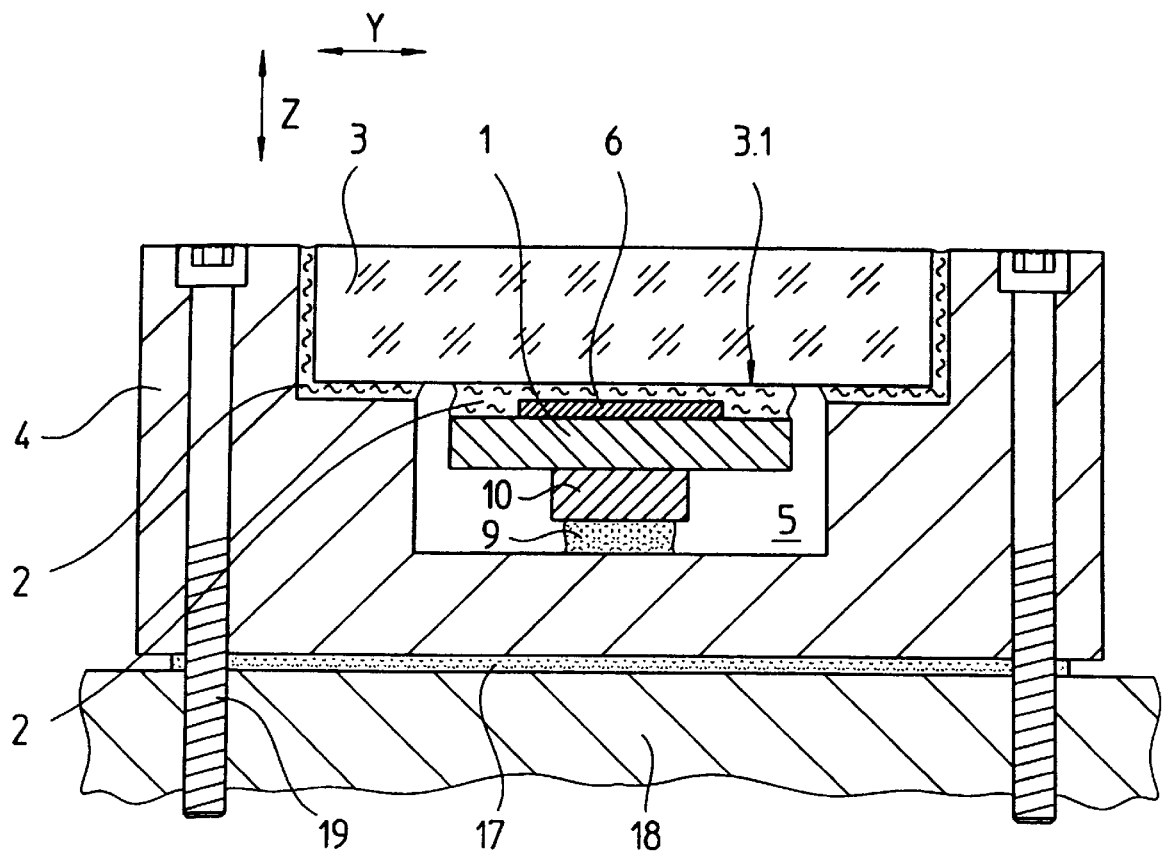
FIG. 6 shows a cross-section of a fourth embodiment of a linear measuring device.

FIG. 6 illustrates a fourth exemplary embodiment of the invention. One important feature of this embodiment is that mount 4 is designed as part of a length measuring device that can be easily assembled or replaced. In particular, mount 4 can be a rail or bar section, which the user can easily detachably secure to a machine tool or measuring machine 18, using known methods. This attachment can be implemented for example by providing an adhesive layer 17 in the form of an adhesive film that bonds on both sides. In a preferred design, only one single fixing point 19 is provided between mount 4 and attachment surface 18. The fixing point can be, for example, formed by screws 19. In the remaining area, mount 4 can be allowed to expand in a manner that is free of forces and strains, in relation to attachment surface 18. It is beneficial to locate fixing point 19 and fixing point 9 at the same position in the X direction.

Mount 4 can also constitute the housing for scanning unit 7 of an encapsulated length measuring device. The guidance for scanning unit 7 can also be provided on the housing and/or on holder 3.

Figure 7:
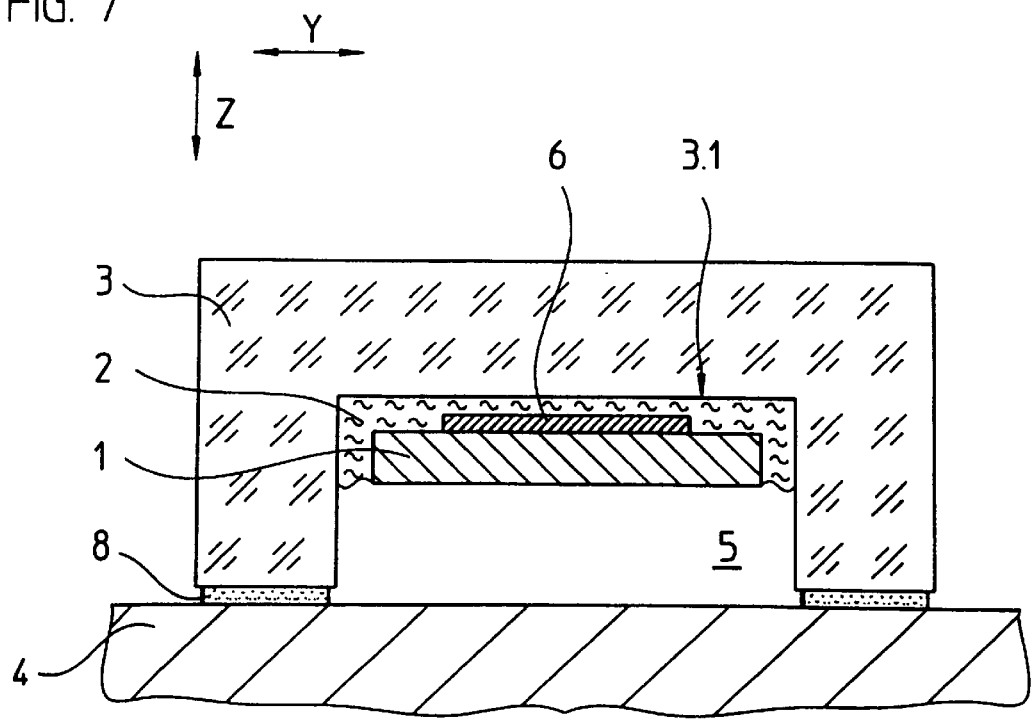
FIG. 7 shows a cross-section of a fifth embodiment of a linear measuring device.

A fifth exemplary embodiment in accordance with FIG. 7 illustrates additional shapes, other than a plate shape, that can be used in a design for holder 3. The design of holder 3 can also include the integration of groove 5 to accommodate the graduated scale carrier member. In this refinement, graduated scale carrier member 1 is also secured to holder 3 laterally, via liquid layer 2, and is locked against a lateral displacement or twisting To prevent a lateral displacement in the Y direction or twisting of graduated scale carrier member 1 in relation to holder 3, in all the exemplary embodiments lateral limit stops can be provided on holder 3 for graduated scale carrier member 1. Such displacement or twisting can also be prevented by a crosspiece, to which graduated scale carrier member 1 is secured via liquid film 2, and whose width corresponds to the width of graduated scale carrier member 1. A similar system is shown in FIG. 6 of European Patent 0 416 391 B1.

In one possible especially advantageous embodiment of the present invention, a steel band can be used as graduated scale member 1. Other materials can also be used to form the band of scale member 1. For example, glass or glass ceramics, and in particular the Zerodur brand glass ceramic, formed as a thin bendable band, can be used as the material for scale member 1.

An especially good result can be achieved when measuring graduation marking 6 is an optically scannable structure such as a reflecting phase grating, or alternatively, a section having reflecting and non-reflecting regions alternating in measuring direction X. In another embodiment, measuring graduation marking 6 can also be formed by magnetically, inductively, or capacitively scannable elements.

What is claimed is:

1. A position measuring device comprising:
   a graduated scale carrier member;
   a measuring graduation marking disposed on the graduated scale carrier member;
   a holder having a first surface, the graduated scale carrier member being adhesively secured to the holder by an elastic intermediate film; and
   a scanning unit for scanning the measuring graduation marking to produce positionally dependent signals, the scanning unit being disposed adjacent a second surface of the holder, opposite the first surface,
   wherein the scale carrier member with the measuring graduation marking is disposed opposite to the scanning unit, and the graduation marking is scannable by the scanning unit through the holder.

2. The position measuring device as recited in claim 1, wherein the elastic intermediate film is a viscous liquid.

3. The position measuring device as recited in claim 2, wherein the viscous liquid is a silicone oil.

4. The position measuring device as recited in claim 1, wherein the graduated scale carrier member is a thin, flexible steel band.

5. The position measuring device as recited in claim 1, wherein the measuring graduation marking is a reflecting and photoelectrically scannable structure.

6. The position measuring device as recited in claim 1, wherein the holder is a transparent, substantially intrinsically stable and flexurally stiff glass body.

7. The position measuring device as recited in claim 1, wherein the intermediate film is a viscous liquid provided homogeneously between the graduated scale carrier member and the holder.

8. The position measuring device as recited in claim 1, wherein the intermediate film is a viscous liquid and the position measuring device further comprises means to form a space between the graduated scale carrier member and the holder, said space being free of viscous liquid.

9. The position measuring device as recited in claim 1, wherein the holder is secured to a mount.

10. The position measuring device as recited in claim 9, wherein the mount comprises a groove for accommodating the graduated scale carrier member, and wherein the groove is covered by the holder.

11. The position measuring device as recited in claim 9, wherein the holder is secured to the mount via an elastic means that is elastic in a measuring direction.

12. The position measuring device as recited in claim 11, wherein the elastic means substantially seals a space between the holder and the mount.

13. The position measuring device as recited in claim 12, wherein the elastic means is one of a permanent-elastic adhesive and a viscous liquid.

14. The position measuring device as recited in claim 10, wherein the groove is filled with a viscous liquid.

15. The position measuring device as recited in claim 9, wherein the holder has opposite longitudinal surfaces extending transversely to the first surface of the holder, said longitudinal surfaces being parallel to and being rigidly secured to corresponding stop surfaces of the mount.

16. The position measuring device as recited in claim 9, wherein the graduated scale carrier member is rigidly secured at one position directly to the mount.

17. The position measuring device as recited in claim 9, wherein the graduated scale carrier member is rigidly secured at one position to the holder, and the holder is rigidly secured at the one position to the mount.

18. The position measuring device as recited in claim 9, wherein the mount is a linear guide.

19. The position measuring device as recited in claim 1, wherein the holder is adapted to guide the scanning unit.

20. The position measuring device as recited in claim 19, wherein the holder comprises at least one V-shaped groove extending in the measuring direction, and the scanning unit comprises corresponding guide elements engaging the at least one V-shaped groove.

21. The position measuring device as recited in claim 1, wherein the first surface of the holder faces the measuring graduation marking.

* * * * *